(12) United States Patent
Landau et al.

(10) Patent No.: US 9,001,700 B2
(45) Date of Patent: Apr. 7, 2015

(54) SCHEDULING AND RESOURCING ALLOCATION ACROSS MULTIPLE DOMAINS

(75) Inventors: John Landau, Mountain Lakes, NJ (US); James Karanassos, Manasquan, NJ (US); Galeal Zino, Salisbury, NC (US)

(73) Assignee: ITXC IP Holdings S.à.r.l., Luxembourg (LU)

( * ) Notice: Subject to any disclaimer, the term of this patent is extended or adjusted under 35 U.S.C. 154(b) by 0 days.

(21) Appl. No.: 12/410,555

(22) Filed: Mar. 25, 2009

(65) Prior Publication Data

US 2010/0250315 A1    Sep. 30, 2010

(51) Int. Cl.
| | |
|---|---|
| H04L 12/16 | (2006.01) |
| H04Q 11/00 | (2006.01) |
| G06Q 10/10 | (2012.01) |
| G06Q 10/02 | (2012.01) |
| G06Q 10/06 | (2012.01) |

(52) U.S. Cl.
CPC ............... *G06Q 10/10* (2013.01); *G06Q 10/02* (2013.01); *G06Q 10/06* (2013.01)

(58) Field of Classification Search
None
See application file for complete search history.

(56) References Cited

U.S. PATENT DOCUMENTS

| | | |
|---|---|---|
| 7,437,463 B1 | 10/2008 | Valletutti et al. |
| 2002/0103864 A1 | 8/2002 | Rodman et al. |
| 2003/0158900 A1 | 8/2003 | Santos |
| 2005/0182942 A1 | 8/2005 | Calin |
| 2007/0171846 A1 | 7/2007 | Li et al. |
| 2009/0013066 A1* | 1/2009 | Pecus ............................ 709/223 |
| 2010/0182395 A1* | 7/2010 | Delhoyo ..................... 348/14.08 |
| 2011/0016129 A1* | 1/2011 | Sheymov ...................... 707/737 |

OTHER PUBLICATIONS

International Search Report and Written Opinion dated Nov. 8, 2010 of International Application No. PCT/US10/27611.
Cisco, "Cisco TelePresence Manager Release 1.4 Administration and Installation Guide". Cisco Systems Inc. Text Part No. OL-13673-03, Published Aug. 7, 2008. [retrieved Apr. 27, 2010]. Retrieved from the Internet. <URL: http://www.ciscosystems.net.ph/en/US/docs/telepresence/cts_manager/1_4/Admin_Guide/CTS-Man_1.4_Admin_Guide.pdf> Entire document, especially: p. 1-9, para 1-4; p. 2-17, para 1; p. 2-28, Table 2-11; p. 3-36, para 2; p. 3-38, para 8; p. 6-105. Step 7; p. 5-91, col. 3, para 5.
International Preliminary Report on Patentability, dated Oct. 6, 2011 of International Application No. PCT/2010/027611, filed: Mar. 17, 2010.
Markus Breidenich, "Related EP Patent Application No. 10 756 604.4 Extended Search Report", Oct. 10, 2013, Publisher: EPO, Published in: DE.

* cited by examiner

*Primary Examiner* — Chirag Shah
*Assistant Examiner* — Srinivasa Reddivalam
(74) *Attorney, Agent, or Firm* — Kaplan Breyer Schwartz & Ottesen, LLP

(57) ABSTRACT

A telepresence conferencing system is disclosed in which scheduling and resource and personnel reservations may be made across various entities (i.e.; domains). Additionally, each location that is part of the telepresence conference may selectively, and independently of the other locations, designate all or selected portions of its media stream be carried over a different network from the one used to setup, control, and reserve resources for the telepresence conference.

4 Claims, 2 Drawing Sheets

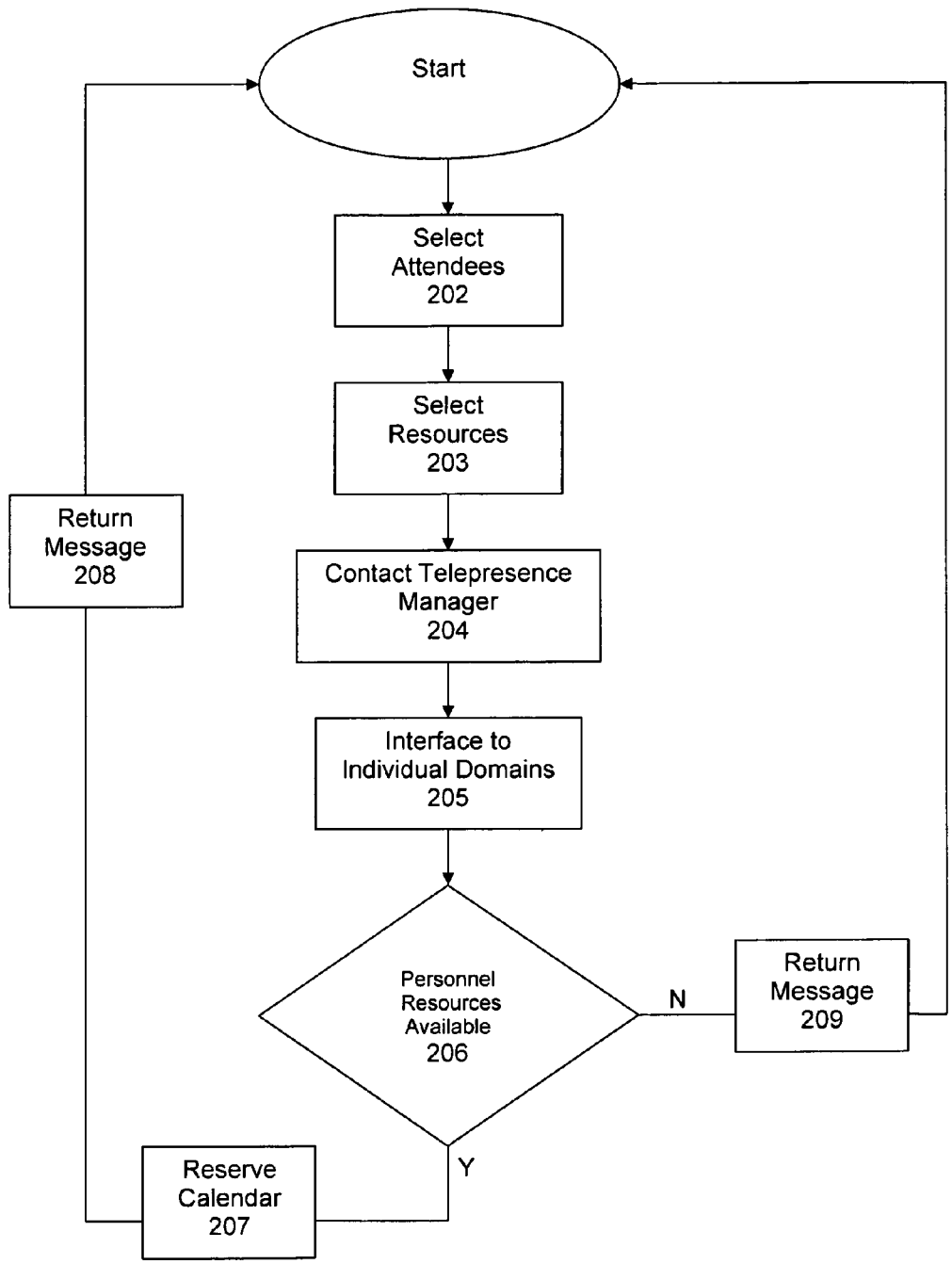

SCHEDULING AND RESOURCING ALLOCATION ACROSS MULTIPLE DOMAINS

TECHNICAL FIELD

This invention relates to communications and connectivity, and more specifically, to improved methodologies for scheduling telepresence meetings and reserving and allocating resources required for such meetings. The invention may be used generally to reserve and use resources among plural independent entities that would otherwise not be capable of interacting with one another in a seamless manner.

BACKGROUND OF THE INVENTION

Recently, it has become popular to conduct meetings via videoconferencing, sometimes called telepresence meetings. In a telepresence environment, locations from around the globe are connected via high speed video bandwidth communications links, and an appropriate conferencing bridge or other connection (e.g.; point to point) for managing same. The user end of these high bandwidth links typically contains a telepresence conference room comprising one or more video screens, sound equipment, etc. Many of the higher end videoconferencing systems can cost upward of $200,000 to $300,000 for the room full of required screens, audio, etc.

Moreover, to implement high speed videoconferencing acceptable to most businesses requires extremely high bandwidth lines, and an expensive communications infrastructure. These telepresence systems are not simple Internet video streams, but are implements using dedicated bandwidth over private networks, wherein each link can require 20-30 megabit/second connections.

The cost of installing these hi bandwidth connections is excessive. Even when shared connections are used, there is typically a permanent 20-30 megabit per second line required from each telepresence conference room across a long haul private network, to a private bridging device.

Another issue confronting inter-organizational telepresence meetings is the scheduling and reservation of resources and personnel. To appreciate the problem first requires an understanding of how such scheduling and reservation of resources is conducted within a single organization.

Assuming a single organization (e.g.; one company) with plural locations desires to conduct a telepresence meeting among its locations, Telepresence systems exist to reserve and implement such a meeting. Typically, a routing manager computer (RMC) is used to interface with the company's standard calendaring software program. A private dial plan is used to connect all the Telepresence rooms, and the RMC operates in a manner analogous to a local Internet Protocol (IP) Private Branch Exchange (PBX).

Because the RMC is trusted and behind the firewall of the organization, it may interface with the calendaring software of the individual participants, and hence, facilitate the telepresence meeting by reserving personnel and conferencing resources, such as Telepresence equipped rooms in the company.

When meetings are to be conducted across multiple organizations, a problem arises. Typically, companies will not permit some third party computer to access the calendaring software or reserve resources of the company. As a result, Telepresence meetings among plural companies are usually set up through ad-hoc scheduling such as what is known as "meet me" systems, or by arranging the Telepresence meeting with other companies in advance through unstructured email, phone calls, etc.

As can be appreciated from the above, the reservation and implementation of telepresence meetings using available technology is bandwidth intensive, expensive, and cumbersome to implement. Additionally, the scheduling and reservation of resources for such Telepresence meetings across multiple companies is cumbersome and non-automated. Therefore, a need exists for an improved method and apparatus for implementing such telepresence meetings, both within a company and across multiple companies.

The above and other objects of the invention are achieved by employing a telepresence manager computer (TMC) and a plurality of Telepresence Interface Computers (TIC) to implement Telepresence conferences among multiple, potentially unrelated entities. Each "domain"—typically a single organization, group, or company, continues to employ and operate its own RMC, similar to the prior art described above. However, a system wide TMC interfaces with the RMCs on plural domains, so that the combined operation of the RMCs and the TMC operate almost as if there were once large RMC and the numerous companies among which the Telepresence conference is to be implemented were really one large one company To ensure proper security is implemented, each domain has its own TIC that restricts rights and privileges, and thus precludes the TMC from reserving resources or personnel within that organization in violation of the policies of that particular organization.

Finally, once the Telepresence conference is established, each location may determine that its media stream is to be carried to and from the conference by the domain's private network, by one or more third party networks, or a combination of both.

These and other advantages of the present invention will be best appreciated form the following description.

BRIEF DESCRIPTION OF THE DRAWINGS

FIG. 2 depicts a flowchart of an exemplary set of steps to be used in carrying out an embodiment of the invention.

DETAILED DESCRIPTION OF THE PREFERRED EMBODIMENT

Figure 1:
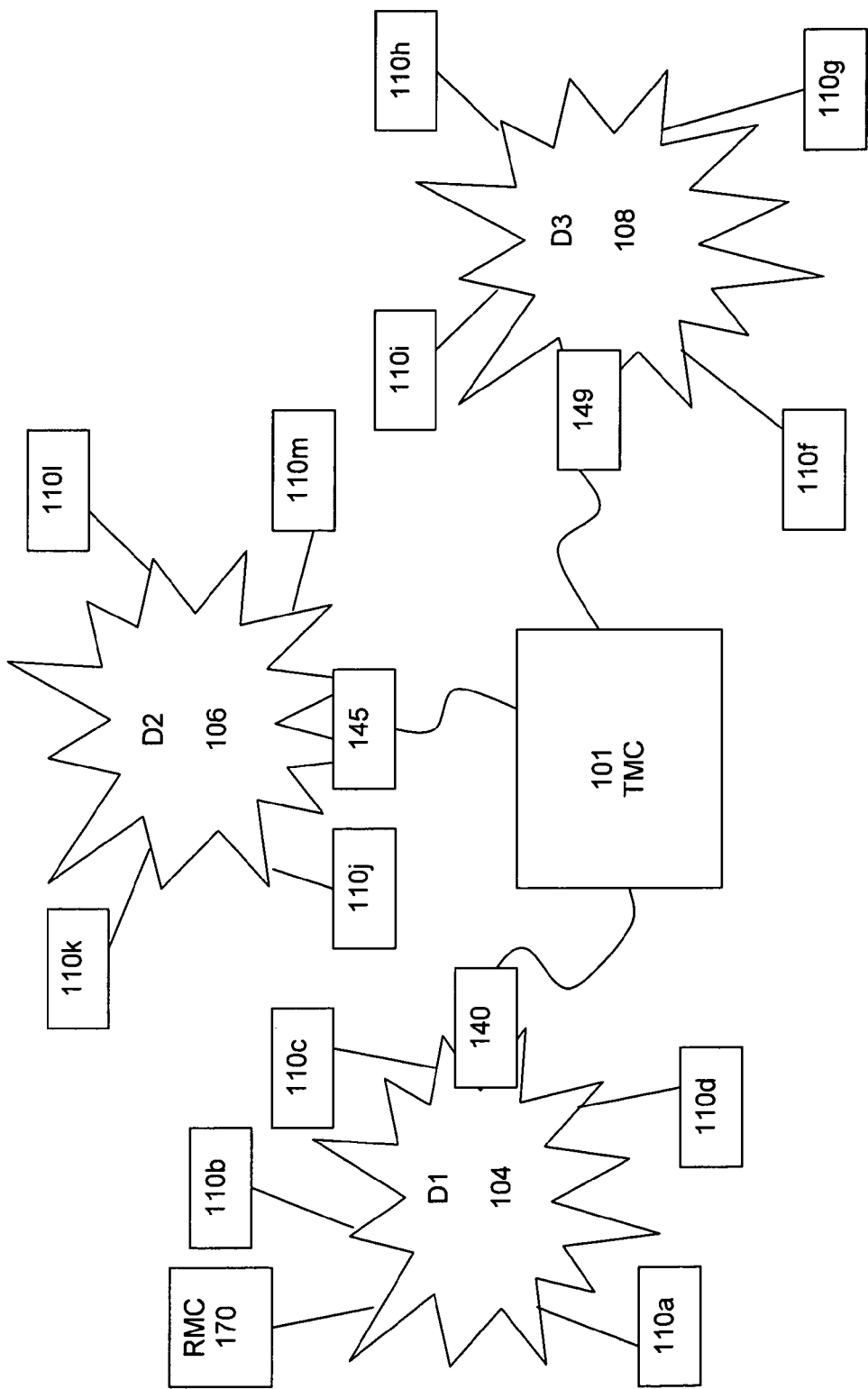
FIG. 1 depicts a network environment and appropriate computing devices for implementing a telepresence conferencing system in accordance with the present invention.

FIG. 1 depicts a very high level conceptual diagram of the present invention. The arrangement of FIG. 1 includes a TMC 101 connected via a suitable Internet Protocol ("IP") or other connection to several domains 104, 106 and 108. Each domain includes a plurality of computers 110 which typically represent standard computing devices such as servers, computers, etc., connected to a local area network within a particular business organization. Additionally, each domain has one or more telepresence resources, such as conference rooms, audio equipment, etc., which need to be reserved for use when appropriate. Software and hardware for doing so is available for access on each domain's network.

The domains 104, 106 and 108 are intranets that are typically within one corporation and within one location. For purposes of explanation herein, a domain is intended to include a set of computers within an organization and behind a single security firewall such that computing devices outside the set are typically blocked from access. Domains are typically isolated from other domains by authentication, security, and other trust policies, but can be thought of as a single entity of which a user must be a part to have privileges typically given only to those on the domain. Each domain includes a tic 140, 145 and 149 as shown. The TICs describe privileges and access rights that selectively permit users of computers 110 on other domains to access resources and calendaring functions on a particular domain.

Domain 104 shows an RMC 170, which is used to interface with the calendaring and resource reservation software on domain 104. The functions of RMC 170 may be implemented on domains 106 and 108 in the TIC. Additionally, the TIC 140, 145 and 149 contain a table or other file that indicates which telepresence resources are available on the associated domain. Such resources may include conference rooms, audio devices, etc. Although a table of file is discussed, the data therein may vary dynamically with ongoing updates, or by time of day, day of week, etc.

TICs 140, 145 and 149 may also store group addresses, such as "monthly group leader meeting", etc., which group address has an associated set of resources and personnel.

To arrange for a Telepresence conference spanning multiple domains, the required or requested resources and personnel are designated by a user to TMC 101. TMC 101 then interfaces with the TICs 140, 145, and 149 in order to reserve the personnel and resources on the domains 104, 106, and 108. The TICs may attempt to reserve the proper resources and personnel, or may communicate the request to the domain's RMC 170, for example, and permit the RMC 170 to do so. The operation of the TICs to facilitate the reservation of such resources and personnel is described further below.

In an exemplary use of the system depicted in flow chart form in FIG. 2, at block 201 the method starts. The user interface is presented to a user desiring to arrange for a teleconference, and the user selects the attendees at block 202. The attendees may be on one or more different domains.

At block 203, the user selects resources associated with the conference. This may be done entirely manually, automatically, or semi-automatically. For example, a user may select from the interface a specific telepresence conference room within each domain where the attendees from that domain are to attend the teleconference. Alternatively, the user interface could simply ascertain an available telepresence conference room for each domain by conducting a query at the TICs 140, 145 and 149 associated with each domain.

After the attendees and optionally resources are selected, control is transferred to block 204 for contact with TMC 101.

Telepresence manager 101 parses the list of attendees and contacts the appropriate domains through TICs 140, 145 and 149 as appropriate. Each of these TICs contains selected filtering to permit resources within the domain to be accessed, consumed, and reserved.

Several options for the filtering permit refinement of privileges and access rights.

For example, if a domain has three telepresence conference rooms, the TIC 149 may be setup to allow only one of those telepresence conference rooms to be reserved by users from other domains requesting telepresence conferences in which a user of said domain is to participate. Alternatively, any of the one or more resources in a particular domain may be restricted for use only during certain times if the requester is not on the particular domain at issue. Any combination of access rights associated with any of the resources on a particular domain may be stored in the TIC 149 associated with that particular domain.

Additionally, users that are associated with a particular domain may have access rights associated with their own bandwidth. For example, a user's calendaring program may be automatically contacted and at certain times reserved for participation by the user in a telepresence meeting. However, there may be restrictions placed so that a user of another domain could not reserve the time of a user of a particular domain unless the user whose time is to be reserved responds with an approval. Alternatively, there may be certain blocks of time that a user designates so that users and other domains may automatically reserve the user's time for a telepresence meeting at any point during the designated times. Additionally, the TIC 149 may include access rights associated with various different resources and personnel on the particular domain 108.

The TIC 149 may also contain access rights associated with users on other domains, thereby defining which users on other domains can access various personnel and resources to reserve and consume them for specific times on the particular domain 108. Ideally, a combination of the foregoing two examples provides the greatest level of granularity and flexibility. For example, TIC 149 may have information prescribing a user of computer 110B on domain 104 may reserve the time of the users of computer 110G and 110H during particular hours, but may never reserve the time of the user associated with computer 110E. Additionally, a user 110L from domain 106 may have different rights to reserve different telepresence conference rooms and/or the time of users on different computers on domain 108. Hence, the access rights can be mapped to the particular personnel and resources on the particular domain with which the TIC is associated, or can be mapped to users on other domains, or a combination of both.

Regardless of the particular policy of any specific TIC, the telepresence manager 101 contacts the appropriate individual domains in order to reserve the personnel and resources for the telepresence meeting. Alternatively, and as shown on domain 104, the TIC 140 may contact RMC 170 which then itself interfaces to the calendaring and other software for domain 104 and performs the appropriate reservation and scheduling. In another embodiment, the TMC 101 may directly contact and reserve the resources on a domain, provided it is subject to the security policies set by the domain, either through the TIC for that domain, or otherwise.

The telepresence manager 101 determines which individual TICs 140, 145 and 149 should be contacted based upon the requested attendees. Alternatively, the telepresence manager 101 may simply broadcast the request to all TICs, with the individual TICs determining on their own whether the requested telepresence meeting involves a resource or individual located within their specific domain.

At block 206, a query is made to determine if the appropriate personnel and resources are available on the domain. If not, the TIC 149 may return a message indicating no availability, or may return a message indicating alternative times and dates, or alternative resources. If availability exists, the resources and personnel will be reserved. In either event, the appropriate response message is sent at blocks 208 and 209 back to the TMC 101. When all of the responses are collected, if the telepresence conference can be setup, it is confirmed with the requester. If however, some TICs have found a lack of availability or an alternative, then the resources already reserved are released until an alternative can be tried and/or accepted by the requester.

By permitting the TMC 101 to selectively interface with certain resources on certain domains, or with the RMCs of the domains, the combination of the TMC and the RMCs and domains can facilitate the same private dialing plan as if all resources were located on one large corporate network.

Moreover, plural "virtual" private dialing plans may exist, and any RMC or resource may be a member of one or more of them.

In still another aspect of the present invention, the control signaling for the telepresence meeting is separated from the media channels in order to permit control be implemented over a privately owned network, and media to be partially conveyed over a shared, third party network.

In furtherance of the above, most geographically diverse telepresence systems are built from private high speed networks, although the private high speed networks typically are themselves constructed from a "slice" of bandwidth on a network shared with others. This methodology of doing telepresence conferences requires a large number of very high bandwidth lines to be permanently present in many geographically diverse areas for any company wishing to have its own telepresence conferencing system.

In the present invention, a corporation having such a private network continues to use it for the control portion of setting up teleconferences. Such corporation uses its own computers and protocols to set up the conference, notify and reserve the proper personnel and resources, etc. In the example described above, this is in fact done at the request of TMC 101. However, any location on the telepresence conference may wish to convey that location's media stream via a third party or shared network, which reserves bandwidth for that media stream. Hence, when a telepresence conference is set up, the reservation of resources and coordination of the personnel may be handled by a controller associated only with a specific domain, as that term is defined herein. However, the media stream may be carried either on the same private network or on a third party shared network, with such selection being made independently by each location on the telepresence conference.

By permitting each location to determine whether its media connection is fully on the network of the specific domain, fully on a third party network, or some combination of both, an entity can maintain control and access of its own teleconferencing resources and users. However, each location can, transparent to and independently of the other locations, have its media stream transmitted over a third party network, thereby eliminating the requirement to permanently lease high bandwidth capacity for the purpose of telepresence conferencing.

One exemplary preferred manner in which to implement the foregoing is that the TIC, during setup, communicates its selection to the TMC 101. In this manner, the telepresence manager is aware that media to and from the location will be sent over a different network, and is also aware of the proper terminating points on that different network. Therefore, the use of the different network by one or more locations is transparent to other conference participants, and does not affect the security or control of the individual domain's private network.

In a preferred embodiment, remotely located telepresence conference locations associated with a particular entity may be made "virtually" part of the entity's telepresence network through the use a secondary network. On that secondary network, the media stream can be accepted from such location, and placed onto the network of the particular domain at a location to be specified by the particular location itself.

The system manager, TIC, and other components may be implemented in separate physical computers or may be implemented in a common system, or the functionality distributed across one or more networks.

Additionally, and more generically, the system operates using two sets of one or more networks. The networks may be separated physically or logically, but one set of them is used for control, conference setup, etc. The second set is used to convey the media stream, and each location can separately specify whether its media will travel over the control networks or the media networks. Also, each location can specify that its media is to travel over specified parts of the media network, and specified parts of the control network. The control network is the internal, corporate network, and the media network may be provided by a third party. This allows each entity (i.e.; domain) to manage its own telepresence conferencing ability, but to use third party networks for the media if and when necessary. The third party may optionally meter and charge for usage on specified portions of its network that are used for the media stream.

Additionally, the TIC's may reserve resources on their domains in response to commands from the TMC, or the TMC may act at a proxy TIC to a particular domain, as long as the control of the resources passes the policies for security, etc. of the individual domain at issue.

The present invention generally provides that the "view" into a user is different depending upon who is looking, what domain of which they are a part, etc. For example, members of a particular domain, or one or more members of various domains, are told they can reach a particular individual by dialing X451. However, those without proper privileges will not be connected when they dial X451, or alternatively, may have access through to the individual by dialing such extension only at certain times but not at others. Moreover, password authorization may be used to permit certain users access to certain other users selectively.

Still another embodiment involves use of an operator of a third party network facilitating media channels among the users. The third party network operator can do so without revealing the endpoints or any other information about the participants. Moreover, the capabilities permitted (e.g.; recording of conferences, access to software for viewing items, etc.) can be selectively enabled based upon privileges, domains, passwords, or the policy of the third party network operator.

While the above describes the preferred embodiment of the present invention, various other modifications and additions will be apparent to those of skill in the art. Accordingly, the examples given above are for purposes of explanation, and not by way of limitation.

What is claimed:

1. A method for using telepresence resources among independent domains, comprising:
    defining telepresence resources available on at least one of said domains and storing said available telepresence resources in a telepresence interface computer of said at least one of said domains;
    registering at the telepresence interface computer of said at least one of said domains, privileges to which one or more other of said domains or users associated with said one or more other of said domains are entitled with respect to said at least one of said domains, said privileges being determinative of which of said available telepresence resources on said at least one of said domains that said one or more other of said domains or users of said one or more other of said domains may use;
    providing a telepresence manager computer for managing user requests from any of said domains, said telepresence manager computer being separate from said domains and communicatively connected to each of said domains;
    receiving a request for telepresence resources and a list of attendees from a user of one of said domains at said telepresence manager computer, said request for telepresence resources including a request for at least one of said telepresence resources available on said at least one of said domains;

transmitting with said telepresence manager computer said request for said at least one of said telepresence resources available on said at least one of said domains to said telepresence interface computer;

parsing the list of attendees with said telepresence manager computer and contacting said more other of said domains through a plurality of telepresence interface computers of said more other of said domains and wherein each of the plurality of telepresence interface computers containing selected filtering to permit resources within its corresponding domain to be accessed, consumed, and reserved;

determining with said telepresence interface computer whether said user has access rights to said at least one of said telepresence resources available on said at least one of said domains using said registered privileges; and scheduling, in a computer process, said at least one of said telepresence resources available on said at least one of said domains if said telepresence interface computer determines that said user has access rights to said at least one of said telepresence resources available on said at least one of said domains.

2. The method of claim 1 wherein said telepresence resources include telepresence equipment and telepresence rooms.

3. The method of claim 1 wherein said scheduling computer process is associated with another one of said domains to reserve a specific block of time.

4. A method for arranging a telepresence conference among a plurality of domains, said method comprising the steps of:

providing a telepresence managing computer for managing user requests from any of said domains, said telepresence managing computer being separate from said domains and communicatively connected to said domains;

receiving at said telepresence managing computer a request for telepresence resources and a list of telepresence attendees from a user of a one of the domains;

determining, with said telepresence managing computer, which of the domains has the requested telepresence resources and/or attendees;

transmitting with said telepresence managing computer appropriate portions of the request to telepresence interface computers of the domains determined to have the requested telepresence resources and/or attendees;

parsing the list of telepresence attendees with said telepresence managing computer and contacting said plurality of domains through a plurality of telepresence interface computers of said plurality of domains and wherein each of the plurality of telepresence interface computers containing selected filtering to permit resources within its corresponding domain to be accessed, consumed, and reserved; and, wherein each of the telepresence interface computers comprises a non-transitory computer-readable medium storing one or more instructions comprising: instructions for scheduling the use of telepresence resources of its corresponding domain; and instructions for selectively permitting another domain to schedule the use of its telepresence resources;

wherein the instructions for selectively permitting selectively permits the scheduling in accordance with predetermined policies.

\* \* \* \* \*